(12) United States Patent
Rahmes et al.

(10) Patent No.: US 7,191,066 B1
(45) Date of Patent: Mar. 13, 2007

(54) METHOD AND APPARATUS FOR DISTINGUISHING FOLIAGE FROM BUILDINGS FOR TOPOGRAPHICAL MODELING

(76) Inventors: Mark Rahmes, 2620 Aston Cir., Melbourne, FL (US) 32940; John Karp, 155 Sand Dollar Rd., Indialantic, FL (US) 32903; Anthony Smith, 2075 Bayhill Dr., Melbourne, FL (US) 32940; Stephen Connetti, Jr., 1042 Ellen Ct., Melbourne, FL (US) 32935

( * ) Notice: Subject to any disclaimer, the term of this patent is extended or adjusted under 35 U.S.C. 154(b) by 88 days.

(21) Appl. No.: 11/053,219

(22) Filed: Feb. 8, 2005

(51) Int. Cl.
*G06K 9/48* (2006.01)
*G06T 7/60* (2006.01)

(52) U.S. Cl. .................................................. 702/5
(58) Field of Classification Search .................... 702/5, 702/2; 382/113
See application file for complete search history.

(56) References Cited

U.S. PATENT DOCUMENTS

| | | | |
|---|---|---|---|
| 5,265,173 A * | 11/1993 | Griffin et al. ............... | 382/103 |
| 6,104,981 A | 8/2000 | Louis et al. .................... | 702/5 |
| 6,338,027 B1 | 1/2002 | Fulton ......................... | 702/127 |
| 6,654,690 B2 | 11/2003 | Rahmes et al. ................ | 702/5 |
| 6,664,529 B2 | 12/2003 | Pack et al. ............... | 250/208.1 |
| 6,751,350 B2 | 6/2004 | Crinon et al. ............... | 382/173 |
| 2004/0130702 A1 | 7/2004 | Jupp et al. ................. | 356/5.01 |

OTHER PUBLICATIONS

"Automated Building Extraction and Reconstruction from LIDAR Data", unknown author, Jul. 17, 2004, 27 pages.*

* cited by examiner

*Primary Examiner*—Donald E. McElheny, Jr.
(74) *Attorney, Agent, or Firm*—Allen, Dyer, Doppelt, Milbrath & Gilchrist, P.A.

(57) ABSTRACT

A computer implemented method is for processing a digital elevation model (DEM) including data for a plurality of objects. The method includes determining a perimeter versus area parameter for each object in the DEM, and comparing the perimeter versus area parameter for each object to a threshold to identify whether each object in the DEM is a building or foliage.

24 Claims, 16 Drawing Sheets

Separate Buildings & Trees

Building DEM — 410, Browse...

Perimeter per Area  0.001 [0.006] 0.050    Minimum Posts 1 [7.0] 20.0 — 414

Chord Residue  0.1 [1.5] 20.0 — 416

☐ Use Maximum Tree Height

Bare Earth DEM — Browse...

Maximum Tree Height  0.1 [12.0] 50.0 — 418

☐ Second Pass of Perimeter per Area

Perimeter per Area  0.001 [0.010] 0.050 — 420

Building Output DEM — Browse...
Tree Output DEM — Browse...

% Complete 0  25  50  75  100

[OK] [Cancel]

*FIG. 27*

METHOD AND APPARATUS FOR DISTINGUISHING FOLIAGE FROM BUILDINGS FOR TOPOGRAPHICAL MODELING

FIELD OF THE INVENTION

The present invention relates to the field of topography, and more particularly, to a digital elevation model (DEM) in which foliage and buildings may be distinguished from one another.

BACKGROUND OF THE INVENTION

Topographical models of geographical areas may be used for many applications, including flight simulators and flood plain analysis. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation model (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. For this reason, DEMs generally are not well suited for modeling man-made structures, such as skyscrapers in a downtown area, with sufficient accuracy for many of the above applications.

U.S. Pat. No. 6,654,690 to Rahmes et al. discloses a significant advance in topography. The '690 patent discloses an automated method for making a topographical model of an area including terrain and buildings thereon based upon randomly spaced data of elevation versus position. The '690 patent is assigned to the assignee of the present invention and is incorporated herein by reference in its entirety. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

In particular, a terrain-only DEM is generated and a building-only DEM is generated. Once the buildings have been distinguished from the terrain, polygon extraction is performed for the building data. The '690 patent makes a typographical model of the area including terrain and buildings thereon in a relatively quick manner and with enhanced accuracy. Nonetheless, what generally happens is that much of the foliage, and in particular trees, may be treated as buildings. That is, polygon extraction is also performed on the data representing the trees. This results in a large number of polygons being used to model a tree as compared to the number of polygons used to model a building. When the topographical model is displayed on a viewer, the modeled foliage is not very realistic looking. Consequently, the modeled foliage is manually removed and replaced with a more realistic model. This may be relatively time consuming and labor intensive.

SUMMARY OF THE INVENTION

In view of the foregoing background, it is therefore an object of the present invention to provide a computer implemented method for distinguishing foliage from buildings within a digital elevation model (DEM).

This and other objects, features, and advantages in accordance with the present invention are provided by a computer implemented method for processing a DEM including data for a plurality of objects. The method may include determining a perimeter versus area parameter for each object in the DEM, and comparing the perimeter versus area parameter for each object to a threshold to identify whether each object in the DEM is a building or foliage.

The data for each object includes a height value, and the computer implemented method may further comprise comparing the height value for each object identified as foliage to a height threshold, and re-identifying each foliage as a building if the height value associated therewith is greater than the height threshold.

In addition, the computer implemented method may further comprise determining a second perimeter versus area parameter for each object identified as a building, comparing each second perimeter versus area parameter to a second threshold, and re-identifying each building as foliage if the second perimeter versus area parameter is greater than the second threshold.

The objects identified as buildings may then be separated into a building DEM, and the objects identified as foliage may then be separated into a foliage DEM. Separate building and foliage DEMs advantageously allow more realistic topographical models to be generated with significantly less user intervention.

The computer implemented method may further comprise modeling each building in the building DEM as vectors, wherein each vector may comprise a plurality of polygons. The computer implemented method may further comprise modeling each foliage in the foliage DEM as 3D points.

Another aspect in accordance with the present invention is directed to a computer-readable medium having stored thereon a data structure for processing a digital elevation model (DEM) including data for a plurality of objects. The computer-readable medium may comprise a first data field containing data for determining a perimeter versus area parameter for each object in the DEM, and a second data field containing data for comparing the perimeter versus area parameter for each object to a threshold to identify whether each object in the DEM is a building or foliage.

Yet another aspect of the present invention is directed a computer system for topographical modeling. The computer system may comprise a processor for processing the computer-readable medium as defined above. A display may be coupled to the processor for displaying a topographical model based upon the processing.

BRIEF DESCRIPTION OF THE DRAWINGS

FIG. 27 is a computer screen display for setting the parameters associated with separating the final objects-only DEM into a building DEM and a foliage DEM in accordance with the present invention.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
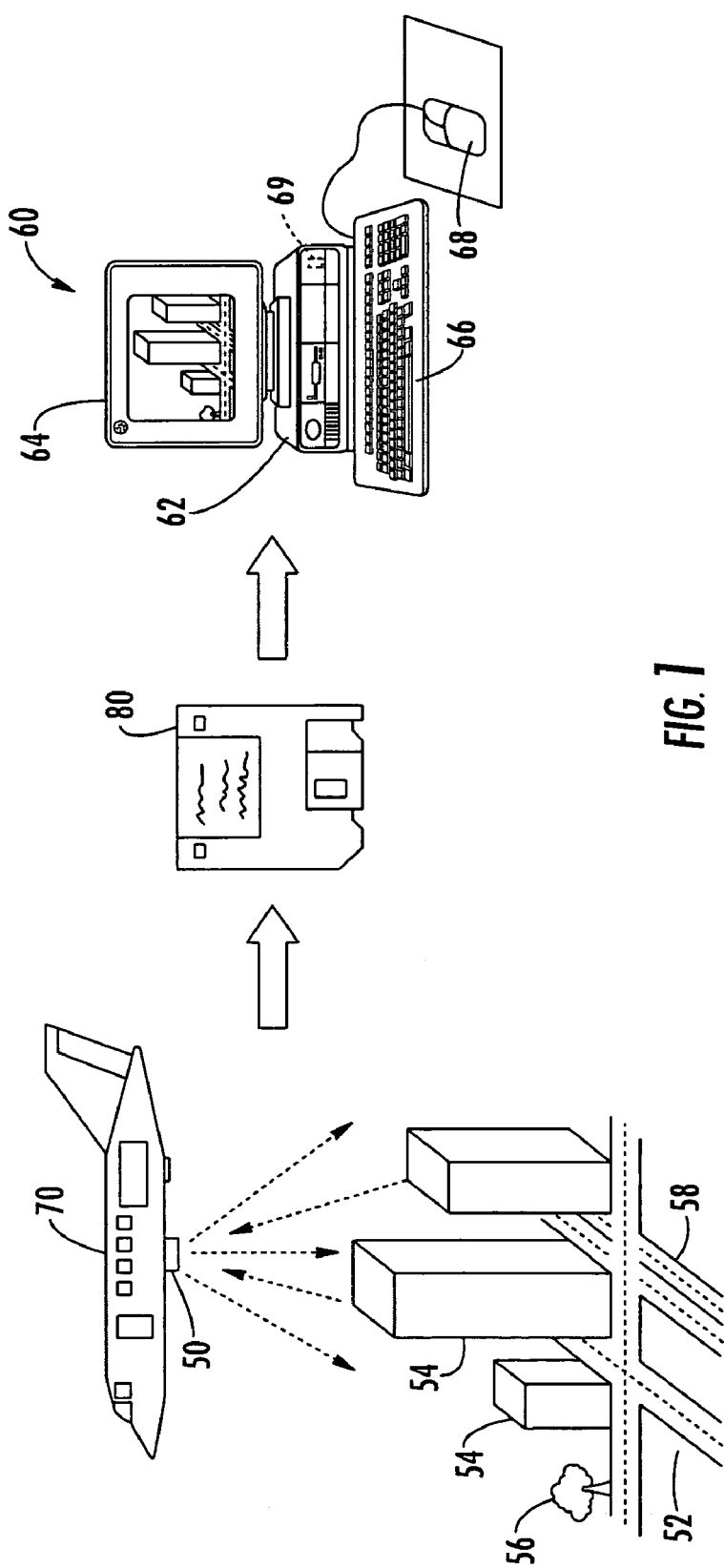
FIG. 1 is a schematic block diagram of collecting topographical data, and generating a topographical model from the collected topographical data in accordance with the present invention.

A collector 50 for collecting topographical data and a system 60 for generating a digital elevation model (DEM) from the collected topographical data will now be explained with reference to FIG. 1. The DEM is of an area that includes terrain 52 and objects on the terrain, wherein the objects may be buildings 54 and foliage 56. The foliage 56 primarily includes trees, and consequently, foliage and trees will be interchangeable. Modeling of the terrain 52, buildings 54 and trees 56 is based upon randomly or arbitrarily spaced data of elevation versus position on the area.

The collector 50, such as a light detection and ranging (LIDAR) collector, may be used for collecting the randomly spaced data. The randomly spaced data may nominally be a set of non-uniformly spaced measurements of position and height. The LIDAR collector 50 may be carried by an airplane 70 over the area of interest, such as a city. The area may also include relatively small features, such as roads 58, for example, as compared to the buildings 54 and trees 56.

Those of skill in the art will appreciate that a LIDAR source provides data including elevation versus position information from a single image. Multiple optical images of the area taken from different perspectives are generally required to provide elevation versus position data, whereas this same information may be obtained from a single LIDAR image. Of course, the present invention may use elevation data versus position data from sources such as optical (e.g., photography), electro-optical, and infrared sources, for example, in addition to LIDAR collectors as will be appreciated by those of skill in the art. The position information provided by the LIDAR data may include latitude and longitude information, for example, though other suitable position indicators may also be used.

Once the randomly spaced data is collected, the data may be stored on a storage medium 80, such as a magnetic or optical disk, for example, for transfer to a computer 62. Of course, other suitable methods for transferring data may also be used, as readily appreciated by those skilled in the art. The randomly spaced data is used by the computer 62 to generate a DEM for viewing.

A display 64 is connected to the computer 62 for viewing the DEM. Input devices such as a keyboard 66 and mouse 68 are also connected to the computer 62. In accordance with the present invention, the computer 62 includes a processor 69 for 1) enhancing the DEM by creating a terrain-only DEM and an objects-only DEM, and then removing noise from the objects-only DEM, and 2) separating the objects-only DEM into a building DEM and a foliage DEM.

Figure 2:
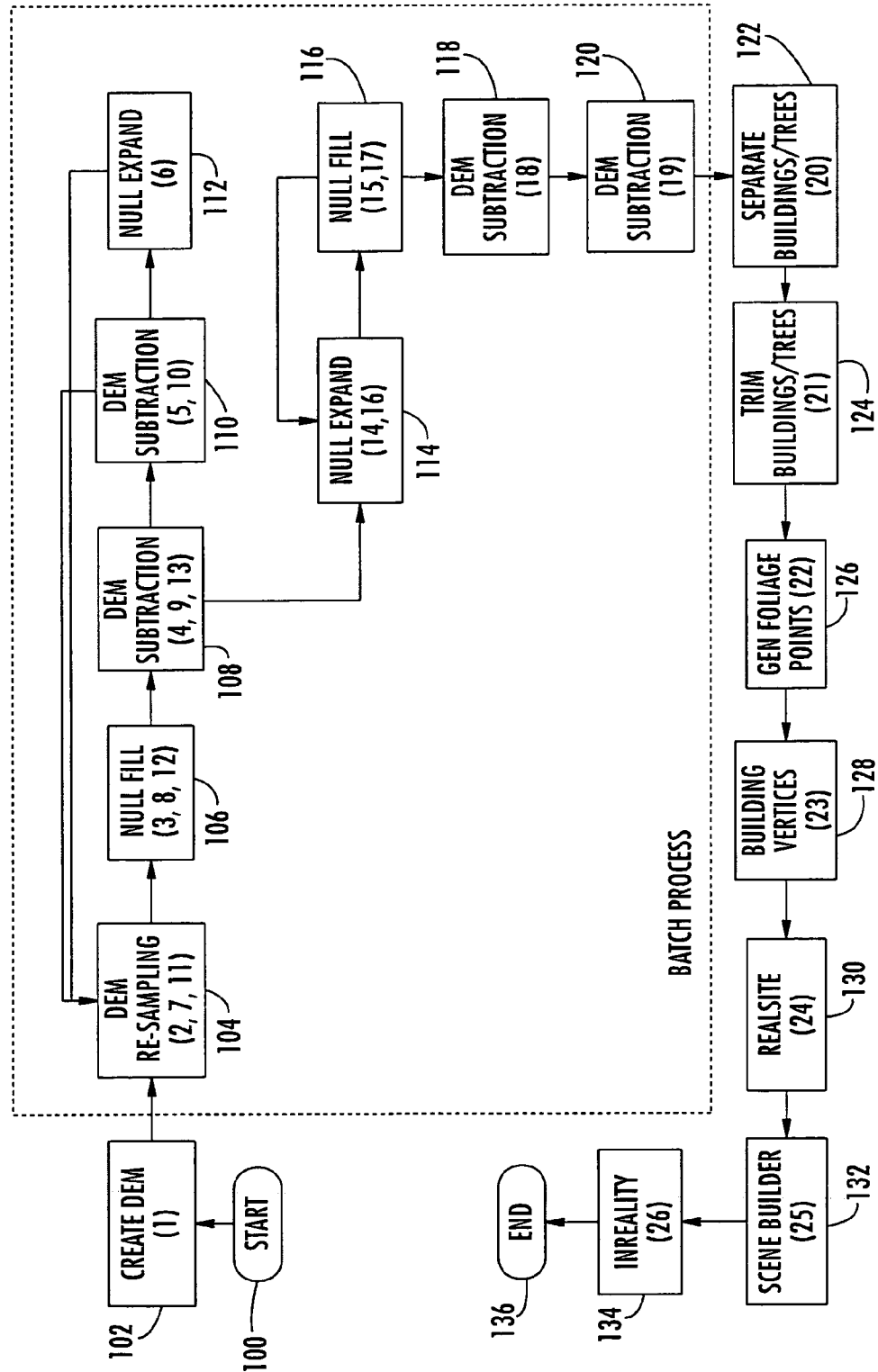
FIG. 2 is a flow diagram for generating a topographical model in accordance with the present invention.

Generating and enhancing an original or initial DEM will now be discussed with reference to the flow diagram of FIG. 2, as well as to the computer display screens illustrated in FIGS. 3–25. In the flow diagram, steps (1)–(19) will initially be discussed, wherein steps (2)–(19) are considered to be part of a batch process as will be discussed in greater below. In the batch process, some of the blocks illustrated in the flow diagram will be discussed more than once since their respective functions are repeated based upon a looping process. The number associated with each step being discussed is provided in parenthesis within the corresponding block to better illustrate the method for enhancing the original DEM.

Figure 3:
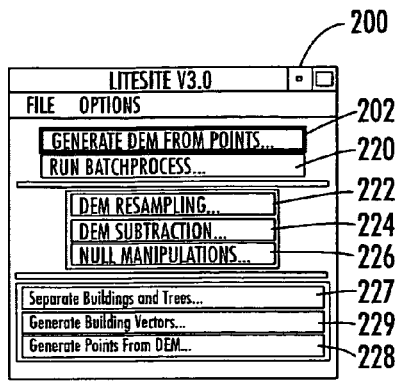
FIGS. 3–5 are computer screen displays corresponding to generating an original DEM in accordance with the present invention.
Figure 4:
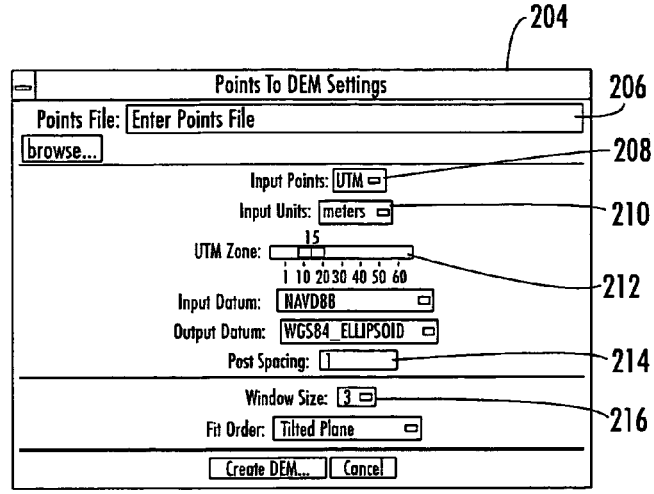

From the start (Block 100), an initial step (1) is using the computer 62 in Block 102 to generate an original DEM from the randomly spaced data as provided via the storage medium 80. Referring to the initial computer screen 200 as illustrated in FIG. 3, the user selects the "Generate DEM From Points" in field 202. This causes a "Points To DEM Settings" computer screen 204 to be displayed, as illustrated in FIG. 4.

Figure 5:
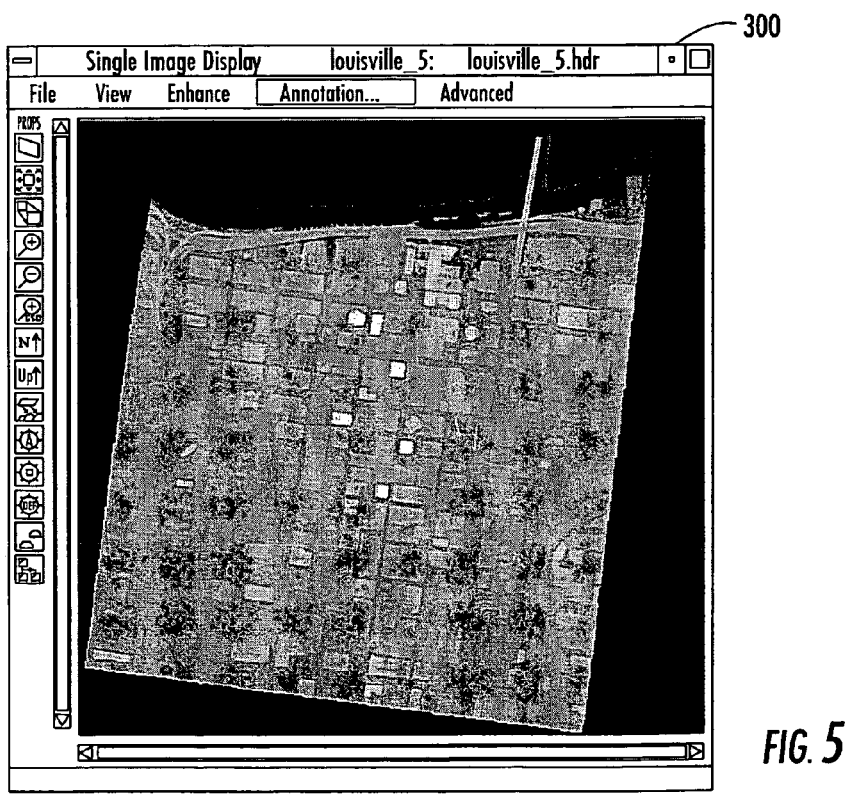

In the "Points To DEM Settings" computer screen 204, the name of the file storing the collected data is entered in field 206. The format of the points is selected in field 208. In this case, the points are based upon a universal transverse mercator (UTM) grid. The unit of measure of the points is selected in field 210, which is in meters, for example. The UTM grid includes 60 north-south zones, with each zone being 6 degrees wide in latitude. The UTM zone of interest is selected in field 212. Zone 15 is selected in field 212, for example. The resolution of the data is selected in field 214, and the window filter size is selected in field 216, as readily appreciated by those skilled in the art. The generated original DEM is provided in the computer screen 300 as illustrated in FIG. 5.

Steps (2)–(19) for enhancing the original DEM are initiated by selecting the "Run Batch Process" in field 220 from the initial computer screen 200 as illustrated in FIG. 3. As the batch process is run, fields 222, 224 and 226 allow the user to set certain parameters associated with the batch process. These parameters will be discussed below.

Figure 6:
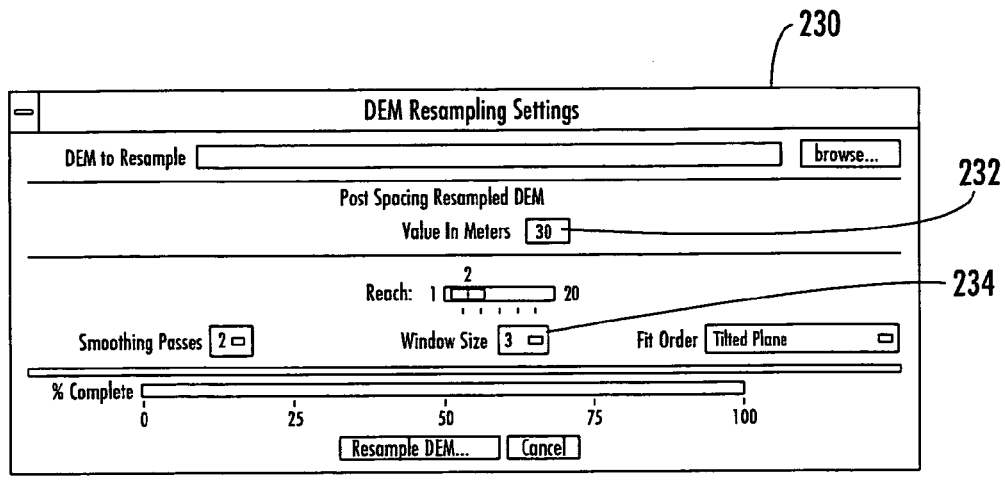
FIGS. 6–7 are computer screen displays corresponding to a re-sampling of the original DEM in accordance with the present invention.
Figure 7:
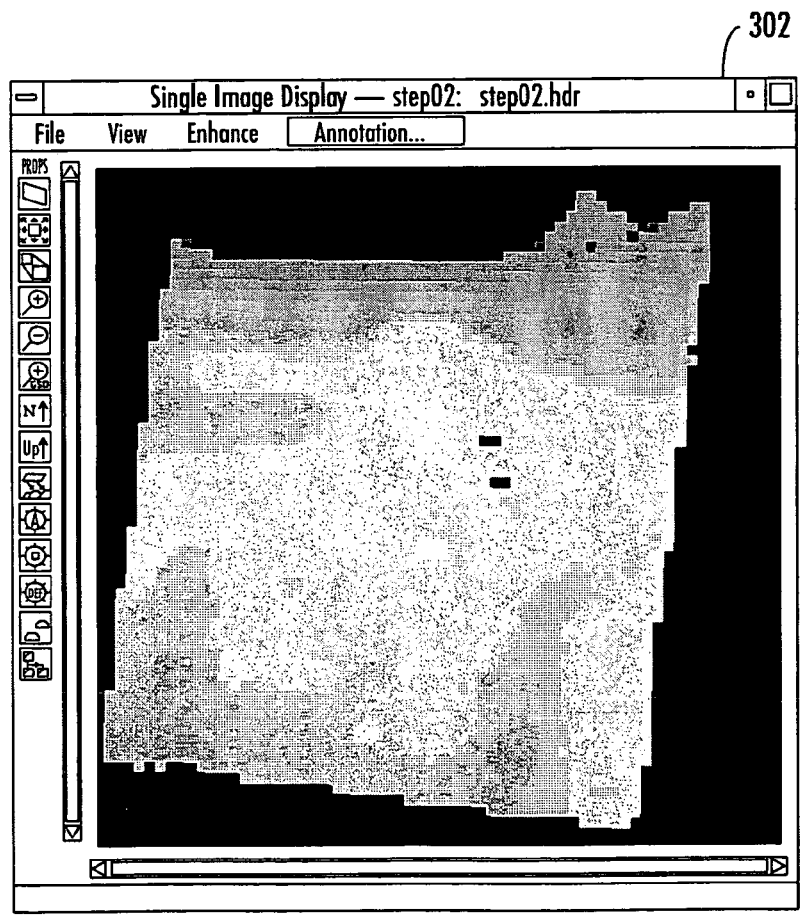
Figure 8:
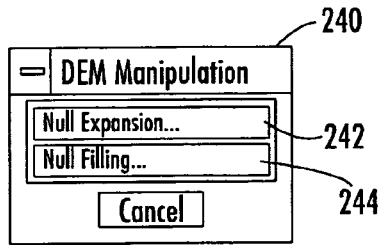
FIGS. 8–10 are computer screen displays corresponding to a null fill process performed on the re-sampled DEM in accordance with the present invention.

In Block 104, step (2) is the re-sampling of the original DEM. The settings associated with the re-sampling are provided in the computer screen 230 as illustrated in FIG. 6. The original DEM had a resolution of 1 meter, for example, and will now be re-sampled at a lower resolution. The resolution is set in field 232, which is 30 meters, for example. The window filter size is also selected in field 234. The result is provided in the computer screen 302 as illustrated in FIG. 7, which is a smoothing of the objects 54, 56 on the terrain 52.

Figure 9:
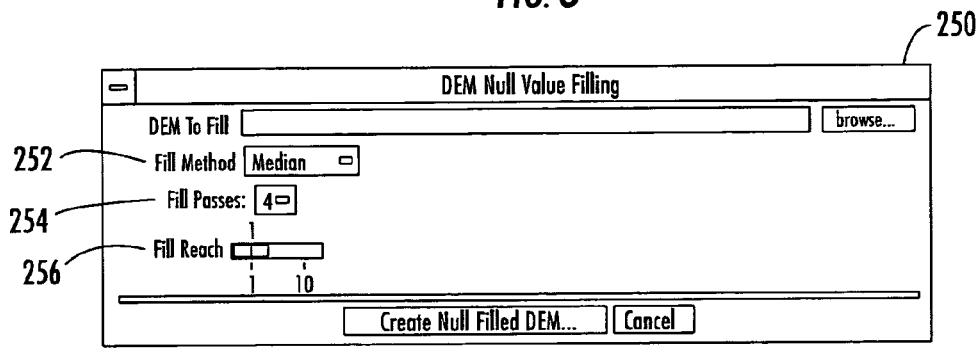
Figure 10:
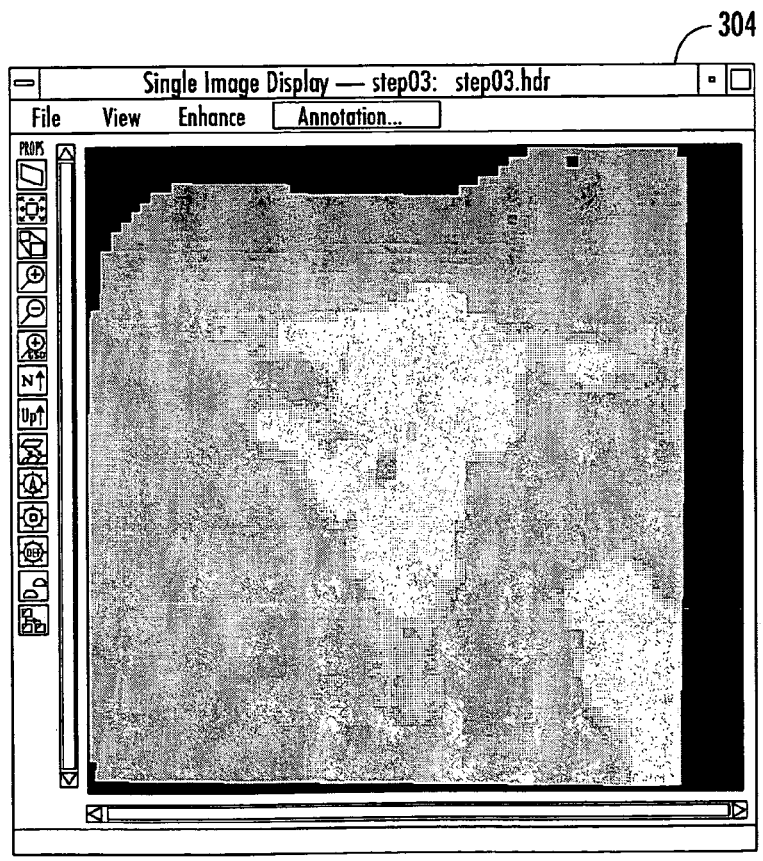

In Block 106, a null fill is performed on the re-sampled DEM. The null fill is associated with the null manipulations provided in field 226 from the initial computer screen 200 as illustrated in FIG. 3. The null manipulations may be divided into a null expansion or a null fill as provided in computer screen 240 in FIG. 8. Field 242 corresponds to the null expansion and field 244 corresponds to the null filling. Since a null fill is being performed, computer screen 250 is displayed as illustrated in FIG. 9. The settings associated with the null fill include field 252 for the method of the fill, field 254 for the number of fill passes to be performed, and field 256 for the fill reach. The resulting re-sampled DEM after null filling is provided in computer screen 304 as illustrated in FIG. 10.

Figure 11:
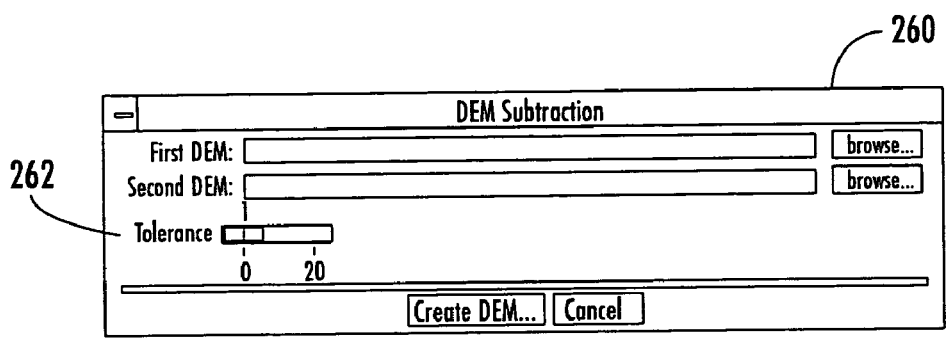
FIGS. 11–13 are computer screen displays corresponding to DEM subtractions for generating an objects-only DEM and a DEM without the objects in accordance with the present invention.
Figure 12:
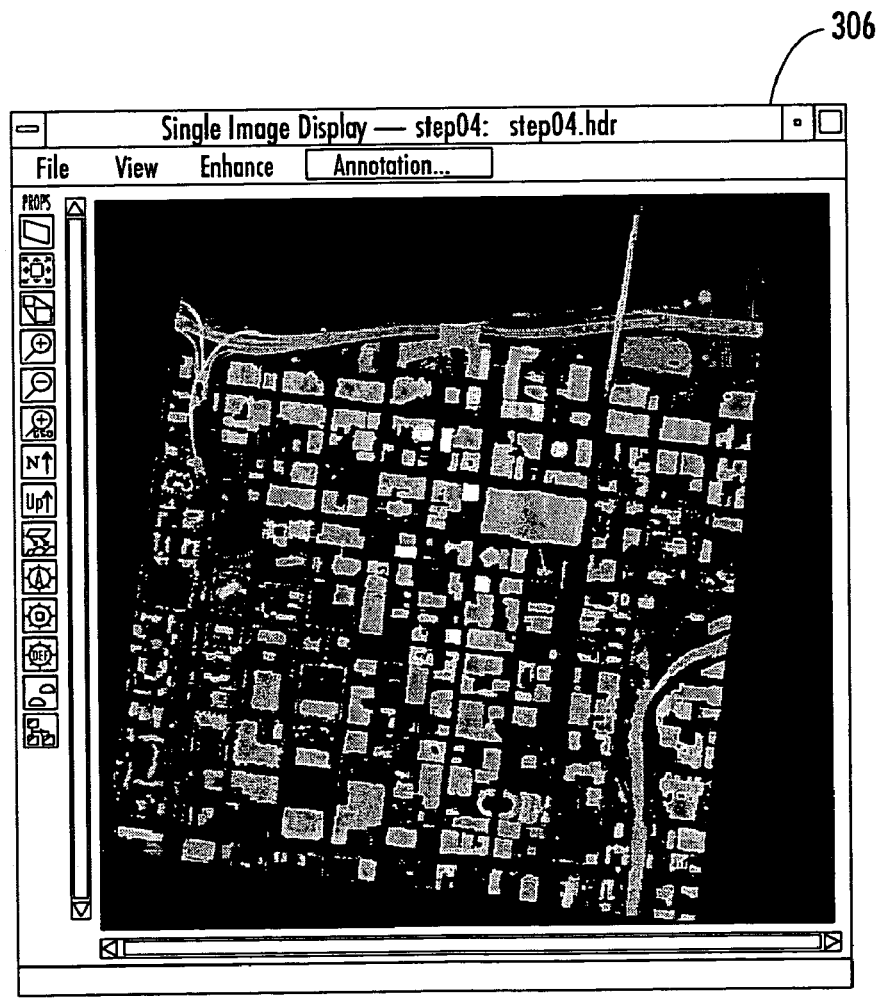

In Block 108, a DEM subtraction is performed. Computer screen 260 is associated with the DEM subtraction as illustrated in FIG. 11. The threshold used in the DEM subtraction is selected in field 262. The re-sampled DEM after null filling in step (3) is subtracted from the original DEM in step (1) to produce an objects-only DEM. The objects-only DEM is provided in the computer screen 306 as illustrated in FIG. 12.

Figures 13, 14, 15:
FIGS. 14–15 are computer screen displays corresponding to a null expand process performed on the DEM without the objects as provided in FIG. 13.
Figure 17:
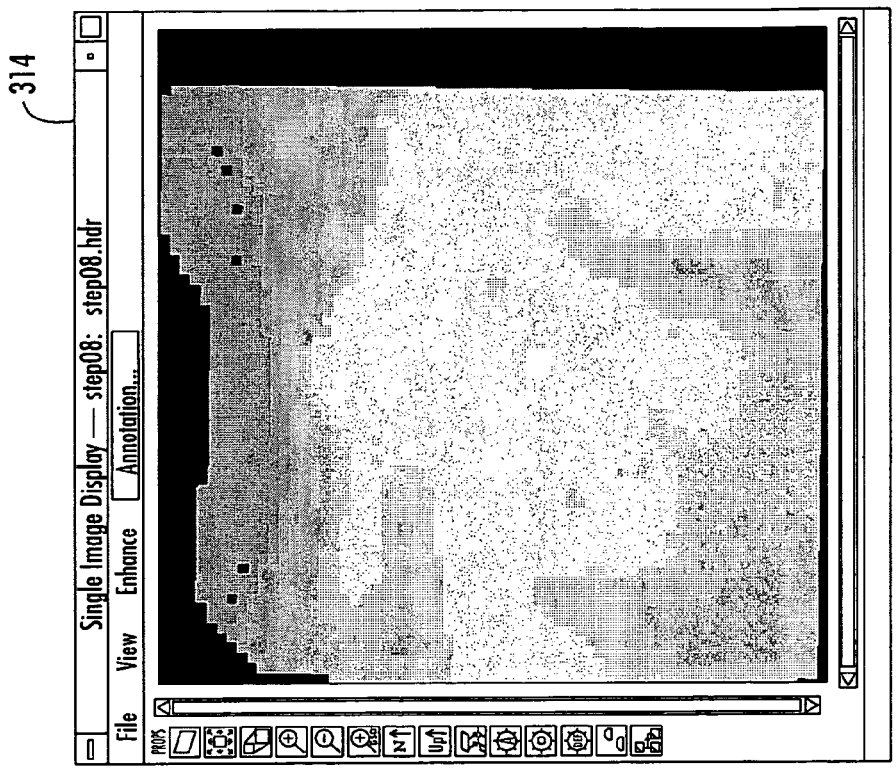
FIGS. 16–17 are computer screen displays corresponding to generation of a terrain-only DEM in accordance with the present invention.

In Block 110, step (5) is another DEM subtraction. The objects-only DEM from step (4) is subtracted from the original DEM in step (1) to produce a DEM without the objects. This DEM is provided in the computer screen 308 as illustrated in FIG. 13.

A null expansion is performed in Block 112 on the DEM without the objects, which corresponds to step (6). The computer screen 270 is associated with the null expansion as illustrated in FIG. 14. The nulls are expanded corresponding to the value selected in field 272. The null expansion makes sure that all the objects have been removed so that the result is a DEM without the objects at the 1 meter resolution, as provided in the computer screen 310 and as illustrated in FIG. 15.

Figure 16:
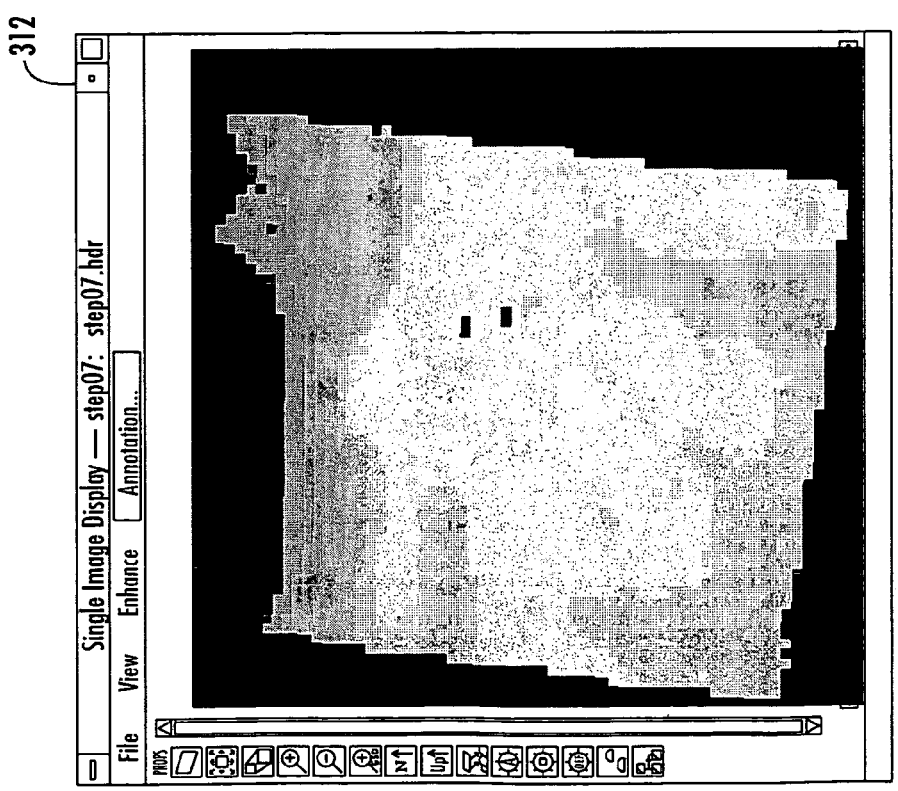

The run batch process now loops back to Block 104 for step (7). Block 104 performs a re-sampling on the DEM without the objects as provided in FIG. 15. The re-sampling is performed at a lower resolution, that is, from 1 meter to 30 meters. The result is provided in the computer screen 312 as illustrated in FIG. 16.

Figure 19:
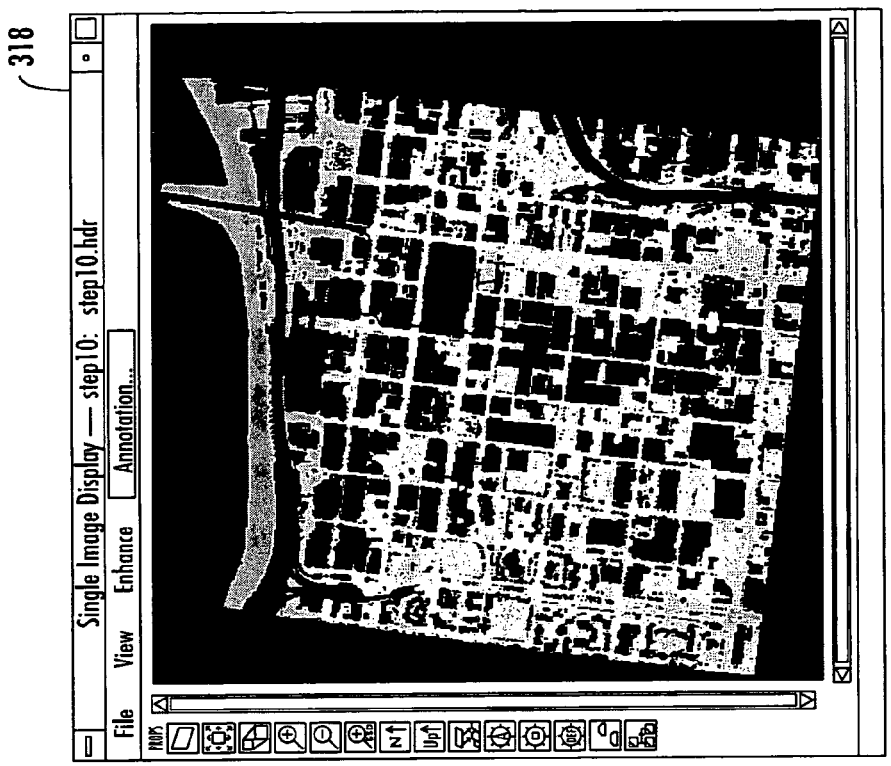
FIGS. 18–19 are computer screen displays corresponding to DEM subtractions for generating an enhanced objects-only DEM and an enhanced DEM without the objects in accordance with the present invention.
Figure 18:
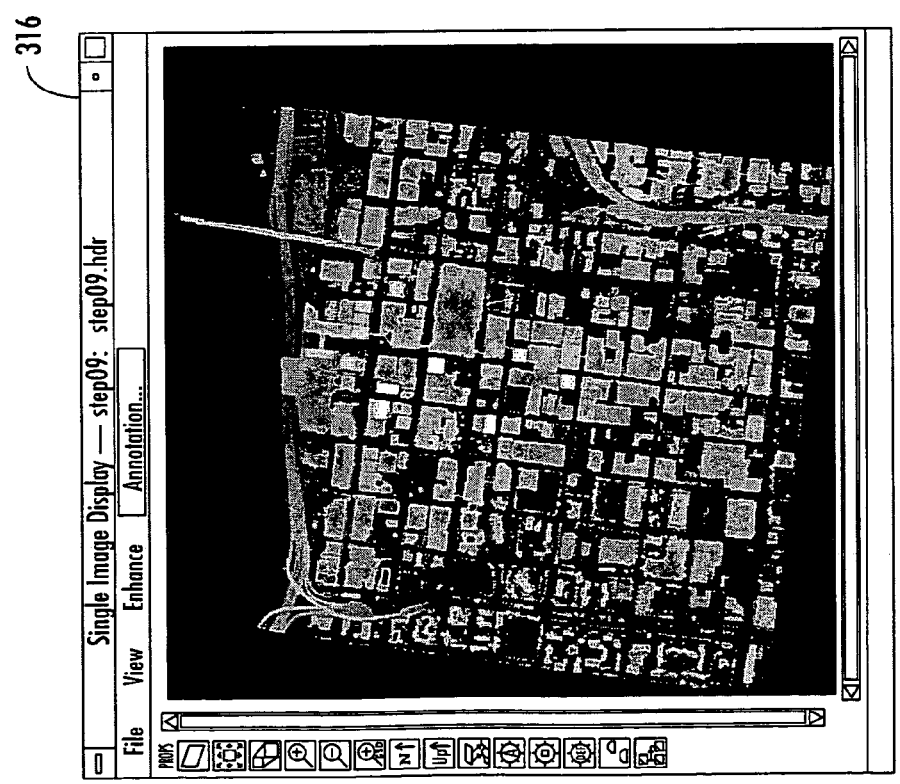
Figure 21:
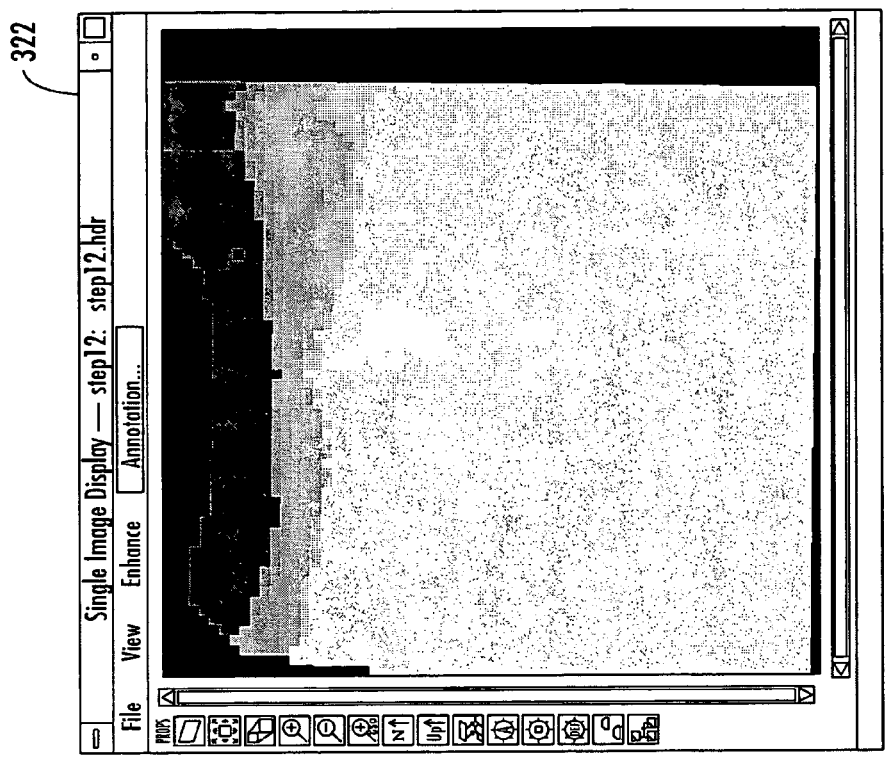
FIGS. 20–22 are computer screen displays corresponding to the generation of a final terrain-only DEM and a further enhanced objects-only DEM in accordance with the present invention.

In Block 106, a second null fill is performed, which corresponds to step (8). The second null fill is performed on the re-sampled DEM without the objects as provided in Block 112. This process generates a terrain-only DEM as provided in the computer screen 314 in FIG. 17. In Block 108, a second DEM subtraction is performed, which corresponds to step (9). The terrain-only DEM from step (8) is now subtracted from the original DEM in step (1) to produce an enhanced objects-only DEM. The enhanced objects-only DEM is provided in the computer screen 316 as illustrated in FIG. 18. In Block 110, step (10) is another DEM subtraction step. The enhanced objects-only DEM from step (9) is subtracted from the original DEM in step (1) to produce an enhanced DEM without the objects. The enhanced DEM without objects is provided in the computer screen 318 as illustrated in FIG. 19.

Figure 20:
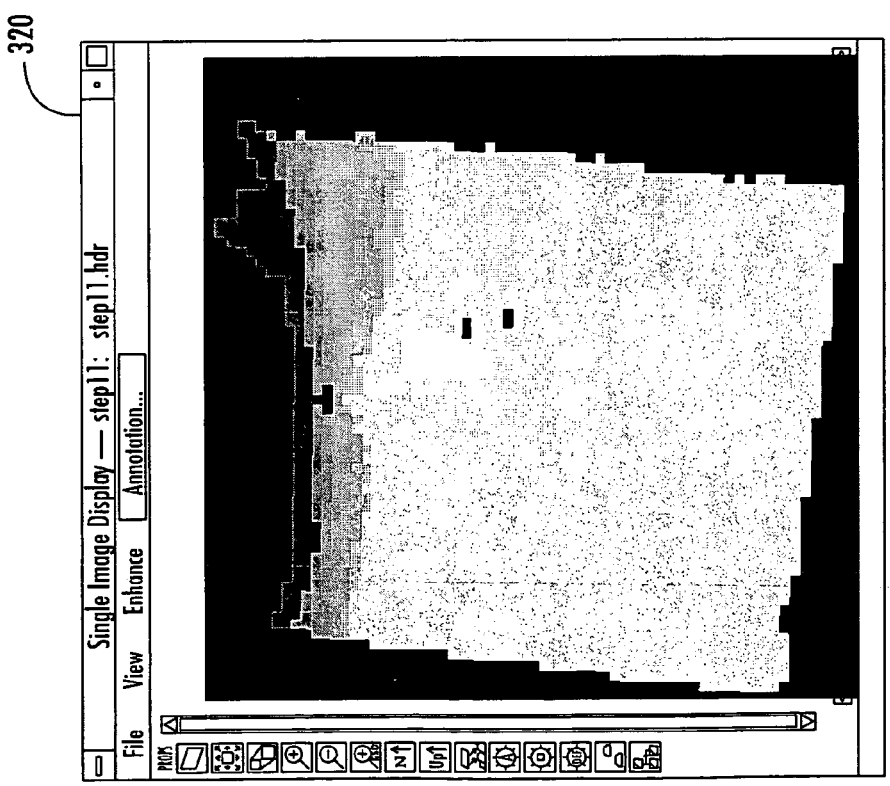
Figure 23:
FIG. 23 is a computer screen display corresponding to the generation of a second further enhanced objects-only DEM based upon a null fill/null expansion in accordance with the present invention.

For step (11), the run batch process again loops back to Block 104. Block 104 performs another re-sampling on the enhanced DEM without the objects as provided by Block 110. As before, the re-sampling is also performed at a lower resolution, that is, from 1 meter to 30 meters. The result is provided in the computer screen 320 as illustrated in FIG. 20.

In Block 106, another null fill is performed, which corresponds to step (12). This third null fill is performed on the re-sampled DEM without the objects as provided by Block 104 to generate an enhanced terrain-only DEM as provided in the computer screen 322 in FIG. 21. This DEM is also referred to as the final terrain-only DEM.

Figure 22:
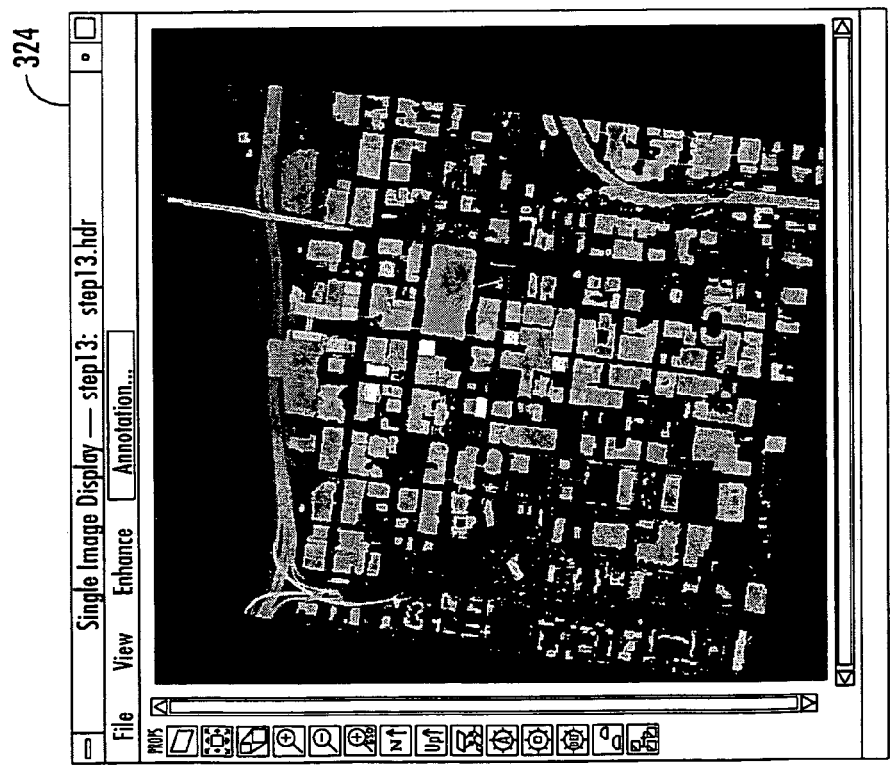

In Block 108, a third DEM subtraction is performed, which corresponds to step (13). The enhanced terrain-only DEM from step (12) is subtracted from the original DEM in step (1) to produce an even further enhanced objects-only DEM. The further enhanced objects-only DEM is provided in the computer screen 324 as illustrated in FIG. 22.

A null expansion is performed on the further enhanced objects-only DEM in Block 114, which corresponds to step (14). In Block 116, a null fill is performed, which corresponds to step (15). Steps (14) and (15) are performed to remove noise from around the objects to generate an even further enhanced objects-only DEM. The process loops back to Block 114 so that steps (16) and (17) are performed. That is, another null expansion and null fill are performed to generate a second further enhanced objects-only DEM as provided in the computer screen 326 in FIG. 23.

Figure 24:
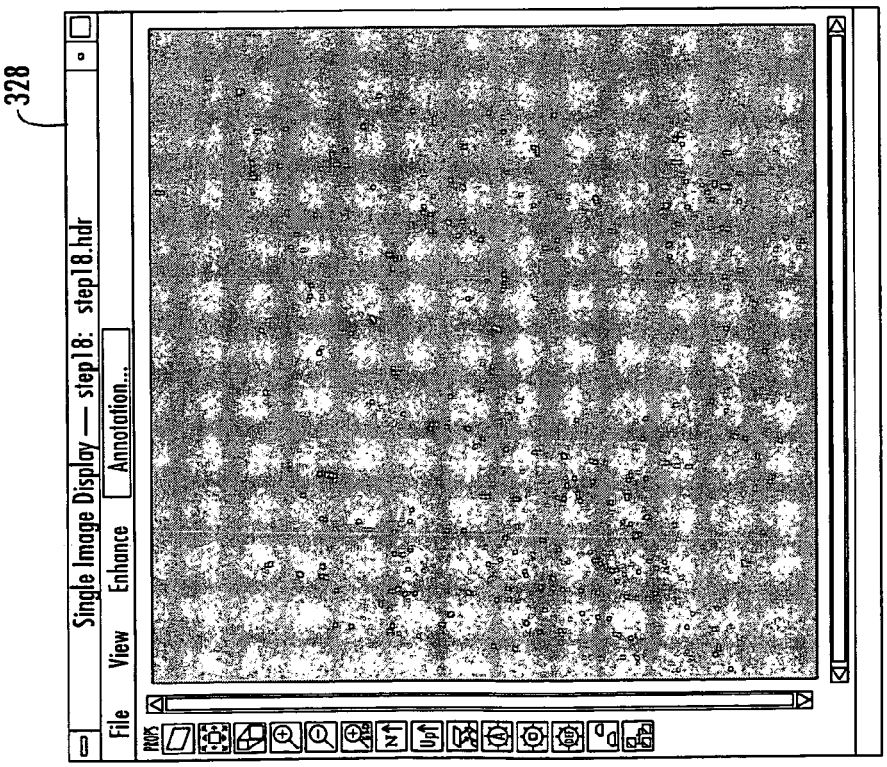
FIG. 24 is a computer screen display corresponding to the generation of a noise-only DEM in accordance with the present invention.

In Block 118, a DEM subtraction is performed. The second further enhanced objects-only DEM from step (17) is subtracted from the further enhanced objects-only DEM from step (15) to produce a noise-only DEM. The noise-only DEM is provided in the computer screen 328 as illustrated in FIG. 24.

Figure 25:
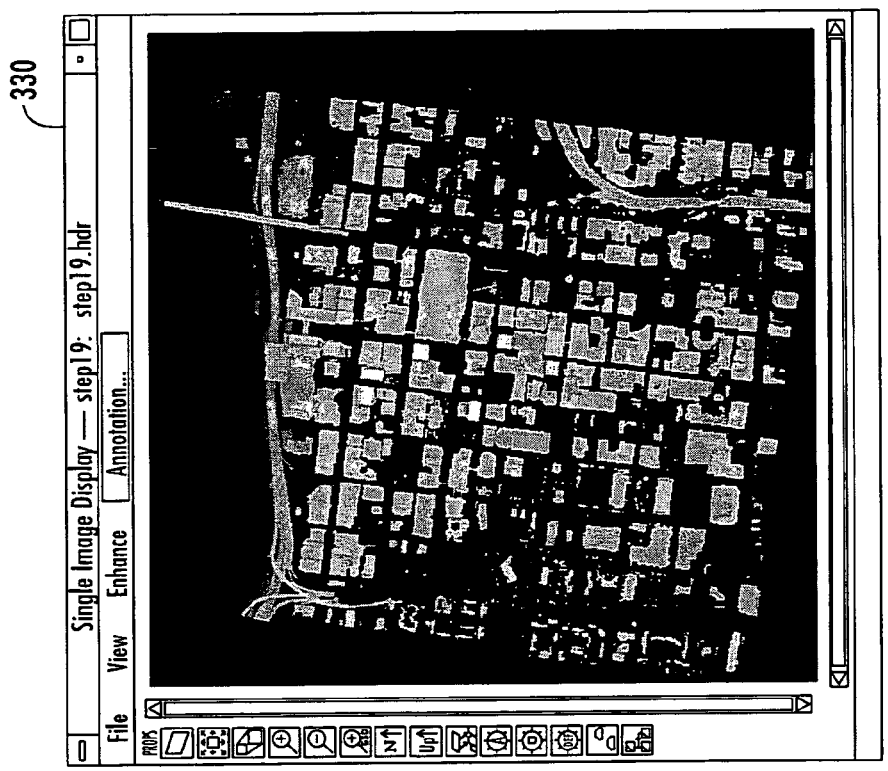
FIG. 25 is a computer screen display corresponding to the generation of a final objects-only DEM in accordance with the present invention.

In Block 120, another DEM subtraction (step 19) is performed. The noise-only DEM from step (18) is subtracted from the second further enhanced objects-only DEM from step (15) to produce a final objects-only DEM. The final objects-only DEM is provided in the computer screen 330 as illustrated in FIG. 25.

As discussed above for steps (2)–(19), a final terrain-only DEM and a final objects-only DEM have been generated. Compared to prior art DEMs, these DEMs are enhanced as a result of the looping iterations performed in steps (2)–(19). Yet another aspect in accordance with the present invention that will now be discussed is the separation of the final objects-only DEM into a building DEM and a foliage DEM.

In other words, the final objects-only DEM is separated into two separate DEMs so that each DEM may be separately processed.

Figure 26:
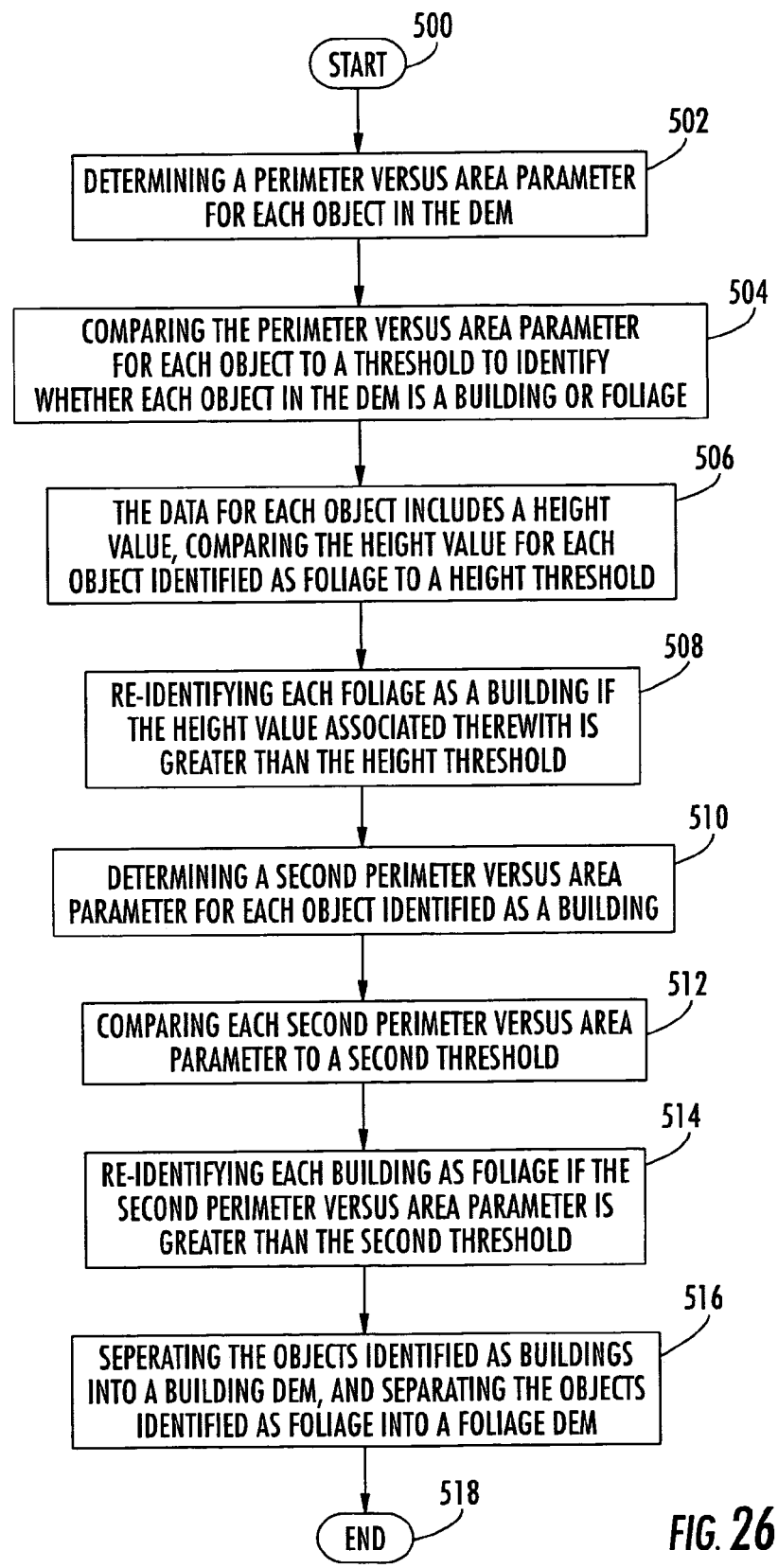
FIG. 26 is a flow diagram for separating the final objects-only DEM as provided in FIG. 25 into a building DEM and a foliage DEM.
Figure 28:
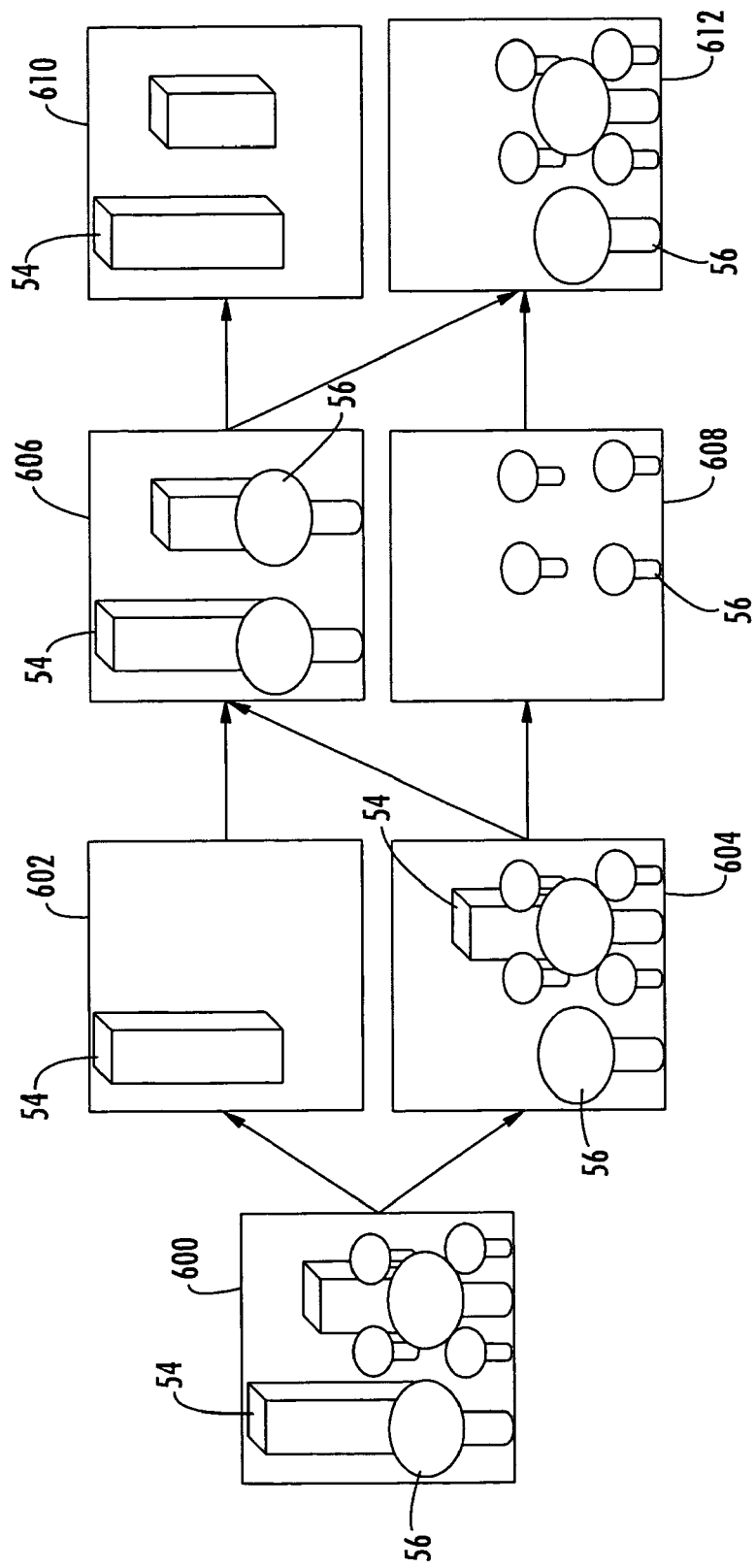
FIG. 28 is a pictorial representation of the steps for separating the final objects-only DEM into a building DEM and a foliage DEM in accordance with the present invention.

Separating the final objects-only DEM into a building DEM and a foliage DEM will now be discussed with reference to the flow diagram illustrated in FIG. 26, as well as to FIGS. 27–28. Referring to the computer screen 200 initially illustrated in FIG. 3, the user selects "Separate Buildings and Trees" in field 227. This causes a "Separate Buildings and Trees" computer screen 410 to be displayed, as illustrated in FIG. 27.

Still referring to FIG. 27, the user has the option of selecting several threshold parameters. Since the separation is performed based upon calculating a perimeter per area for each object, as well as the height of each object, corresponding comparison threshold values are set via the computer screen 410. For instance, the perimeter per area threshold is set in field 412. The minimum size of each object to be considered is set in field 414. This field is labeled as the minimum posts. The chord residue is selected in field 416, and corresponds to a width or length of a side of the object being considered. A maximum tree height is selected in field 418. A second threshold to be associated with a second perimeter per area test is selected in field 420. This second threshold selected in field 420 may be different than the first threshold selected in field 412.

To start separating (Block 500) the final objects-only DEM into a building DEM and a foliage DEM, a perimeter versus area parameter for each object in the final objects-only DEM is determined in Block 502. For purposes of explaining the present invention, reference will also be made to FIG. 28, which provides a pictorial representation of how the final objects-only DEM is separated into a building DEM and a foliage DEM. For instance, a simplified representation representing the final objects-only DEM as initially illustrated in FIG. 25 is provided in frame 600 in FIG. 28.

As illustrated in frame 600, the objects include buildings 54 and trees 56 grouped together in the same DEM. The perimeter versus area parameter for each object is compared to the selected threshold in Block 504 to identify whether each object in the DEM is a building 54 or foliage 56. Based upon the comparison to the threshold, the objects are separated into a building DEM and a foliage DEM, as illustrated in frames 602 and 604.

The data for each object includes a height value, and the height value for each object identified as foliage 56 in frame 604 is compared to a height threshold in Block 506. In Block 508, each foliage 56 in frame 604 is re-identified as a building 54 if the height value associated therewith is greater than the height threshold. As illustrated in frames 606 and 608, the building 54 initially identified as foliage 56 in frame 604 has been re-identified as a building in frame 606. However, tall trees 56 in frame 604 have now been identified as buildings based upon the comparison to the height threshold, as shown in frame 606.

In Block 510, a second perimeter versus area parameter is determined for each object identified as a building in frame 606. Each second perimeter versus area parameter is compared to a second threshold in Block 512. Each building 54 is re-identified as foliage 56 if the second perimeter versus area parameter is greater than the second threshold in Block 514.

The objects identified as buildings 54 are separated into a building DEM, and the objects identified as foliage are separated into a foliage DEM in Block 516. Separate building and foliage DEMs advantageously allow more realistic topographical models to be generated with significantly less user intervention. The building DEM is represented by frame 610, and the foliage DEM is represented by frame 612. The method for separating the final objects-only DEM into a building DEM and a foliage DEM ends at Block 518. The above steps for separating the final objects-only DEM into two separate DEMs correspond to step (20) in FIG. 2.

The remaining steps (21)–(26) will now be discussed. The buildings 54 and the trees 56 will each be modeled differently. Block 124 corresponds to step (21) and is optional, but allows the user to manually clean up or edit the separation of the buildings 54 and trees 56 in case the automatic process failed to correctly identify each object correctly.

In Block 126, which corresponds to step (22), each foliage in the foliage DEM 612 is modeled as 3D points. The user selects the "Generate Points From DEM" in field 228 as shown in FIG. 3 to convert the points into a list of x (latitude), y (longitude) and z (height).

In Block 128, which corresponds to step (23), the buildings are modeled as vectors. Modeling buildings as vectors is disclosed in U.S. Pat. No. 6,654,690 as discussed in the background section. Texture is placed on the polygons representing the buildings in Block 130, which corresponds to step (24). In other words, images are placed on the polygons to give the topographical model a realistic look. RealSite™ is one such commercially available tool to perform this task. RealSite™ was developed by the Harris Corporation, which is assignee of the present invention.

Figure 29:
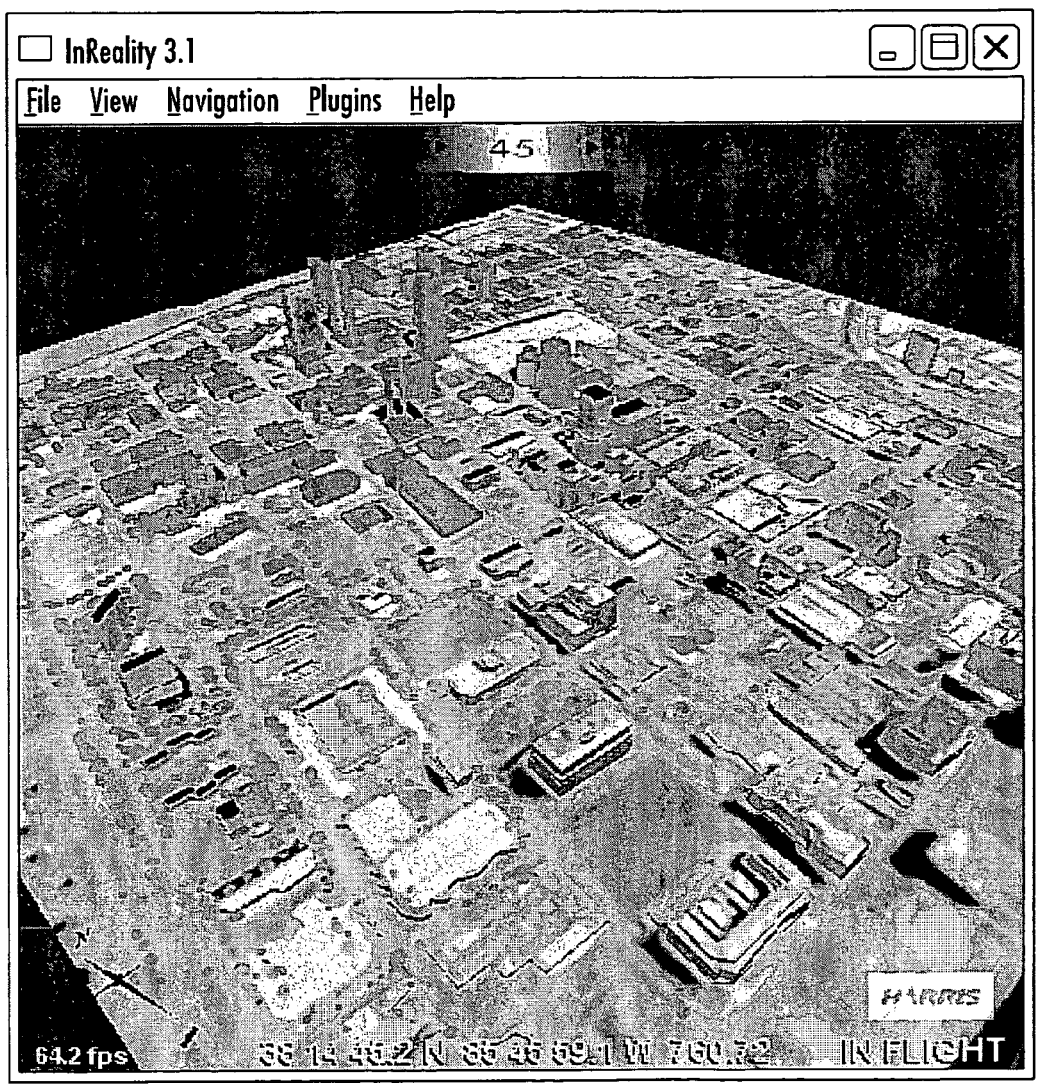
FIG. 29 is a computer screen display of a topographical model generated in accordance with the present invention.

In Block 132, SceneBuilder™ is used to format all of the generated geometry and textures for display on the computer system 60. SceneBuilder™ is also a commercially available tool. Using InReality™ in Block 134, the final topographical model for display is provided, as illustrated in FIG. 29. InReality™ is another commercially available tool developed by the Harris Corporation, and allows the user to navigate virtual scenes and conduct various analyses. InReality™ is designed to be a companion to the RealSite™ software. The process ends at Block 136.

Many modifications and other embodiments of the invention will come to the mind of one skilled in the art having the benefit of the teachings presented in the foregoing descriptions and the associated drawings. In addition, other features relating to topographical modeling are disclosed in copending patent application filed concurrently herewith and assigned to the assignee of the present invention and is entitled METHOD AND APPARATUS FOR ENHANCING A DIGITAL ELEVATION MODEL (DEM) FOR TOPOGRAPHICAL MODELING, Ser. No. 11/053,495, the entire disclosure of which is incorporated herein in its entirety by reference. Therefore, it is understood that the invention is not to be limited to the specific embodiments disclosed, and that modifications and embodiments are intended to be included within the scope of the appended claims.

That which is claimed is:

1. A computer implemented method for processing a digital elevation model (DEM) including data for a plurality of objects, the method comprising:

determining a perimeter versus area parameter for each object in the DEM; and comparing the perimeter versus area parameter for each object to a threshold to identify whether each object in the DEM is a building or foliage.

2. A computer implemented method according to claim 1 wherein the data for each object includes a height value, and further comprising:

comparing the height value for each object identified as foliage to a height threshold; and re-identifying each foliage as a building if the height value associated therewith is greater than the height threshold.

3. A computer implemented method according to claim 2 further comprising:
   determining a second perimeter versus area parameter for each object identified as a building;
   comparing each second perimeter versus area parameter to a second threshold; and
   re-identifying each building as foliage if the second perimeter versus area parameter is greater than the second threshold.

4. A computer implemented method according to claim 1 wherein the objects identified as buildings are separated into a building DEM; and wherein the objects identified as foliage are separated into a foliage DEM.

5. A computer implemented method according to claim 4 further comprising modeling each building in the building DEM as vectors.

6. A computer implemented method according to claim 5 wherein each vector comprises a plurality of polygons.

7. A computer implemented method according to claim 4 further comprising modeling each foliage in the foliage DEM as 3D points.

8. A computer implemented method according to claim 4 further comprising:
   modeling the buildings in the building DEM; and
   modeling the foliage in the foliage DEM; and
   displaying the modeled buildings and foliage on a display.

9. A computer-readable medium having stored thereon a data structure for processing a digital elevation model (DEM) including data for a plurality of objects, the computer-readable medium comprising:
   a first data field containing data for determining a perimeter versus area parameter for each object in the DEM; and
   a second data field containing data for comparing the perimeter versus area parameter for each object to a threshold to identify whether each object in the DEM is a building or foliage.

10. A computer-readable medium according to claim 9 wherein the data for each object includes a height value, and further comprising:
    a third data field containing data for comparing the height value for each object identified as foliage to a height threshold; and
    a fourth data field containing data for re-identifying each foliage as a building if the height value associated therewith is greater than the height threshold.

11. A computer-readable medium according to claim 10 further comprising:
    a fifth data field containing data for determining a second perimeter versus area parameter for each object identified as a building;
    a sixth data field containing data for comparing each second perimeter versus area parameter to a second threshold; and
    a seventh data field containing data for re-identifying each building as foliage if the second perimeter versus area parameter is greater than the second threshold.

12. A computer-readable medium according to claim 9 further comprising:
    an eighth data field containing data for separating the objects identified as buildings into a building DEM; and
    a ninth data field containing data for separating the objects identified as foliage into a foliage DEM.

13. A computer-readable medium according to claim 12 further comprising a tenth data field containing data for modeling each building in the building DEM as vectors.

14. A computer-readable medium according to claim 13 wherein each vector comprises a plurality of polygons.

15. A computer-readable medium according to claim 12 further comprising an eleventh data field containing data for modeling each foliage in the foliage DEM as 3D points.

16. A computer implemented method according to claim 12 further comprising:
    a twelfth data field containing data for modeling the buildings in the building DEM,
    a thirteenth data field for modeling the foliage in the foliage DEM; and
    a fourteenth data field containing data for displaying the modeled buildings and foliage on a display.

17. A computer system for topographical modeling comprising:
    a processor for processing a digital elevation model (DEM) including data for a plurality of objects, the processing comprising
       determining a perimeter versus area parameter for each object in the DEM, and
       comparing the perimeter versus area parameter for each object to a threshold to identify whether each object in the DEM is a building or foliage; and
    a display coupled to said processor for displaying a topographical model based upon the processing.

18. A computer system according to claim 17 wherein the data for each object includes a height value, and wherein said processor:
    compares the height value for each object identified as foliage to a height threshold; and
    re-identifies each foliage as a building if the height value associated therewith is greater than the height threshold.

19. A computer system according to claim 18 wherein said processor:
    determines a second perimeter versus area parameter for each object identified as a building;
    compares each second perimeter versus area parameter to a second threshold; and
    re-identifies each building as foliage if the second perimeter versus area parameter is greater than the second threshold.

20. A computer system according to claim 17 wherein the objects identified by said processor as buildings are separated into a building DEM; and wherein the objects identified by said processor as foliage are separated into a foliage DEM.

21. A computer system according to claim 20 wherein said processor further models each building in the building DEM as vectors.

22. A computer system according to claim 21 wherein each vector comprises a plurality of polygons.

23. A computer system according to claim 20 wherein said processor further models each foliage in the foliage DEM as 3D points.

24. A computer system according to claim 20 wherein said processor models the buildings in the building DEM and models the foliage in the foliage DEM for defining the topographical model being displayed on said display.

* * * * *

UNITED STATES PATENT AND TRADEMARK OFFICE
CERTIFICATE OF CORRECTION

PATENT NO. : 7,191,066 B1
APPLICATION NO. : 11/053219
DATED : March 13, 2007
INVENTOR(S) : Rahmes et al.

It is certified that error appears in the above-identified patent and that said Letters Patent is hereby corrected as shown below:

Title page: (73)

Assignee Info missing    Insert: -- Assignee: Harris Corporation
                                              Melbourne, FL --

Column 1, Line 58    Delete: " typographical"
                     Insert: -- topographical --

Column 2, Line 53    Delete: "directed a"
                     Insert: -- directed to a --

Signed and Sealed this

Seventh Day of August, 2007

JON W. DUDAS
*Director of the United States Patent and Trademark Office*